Oct. 9, 1973 V. E. HAUSER, JR., ET AL 3,764,423

REMOVAL OF DIELECTRIC LEDGES ON SEMICONDUCTORS

Filed March 15, 1972

United States Patent Office 3,764,423 Patented Oct. 9, 1973

3,764,423

REMOVAL OF DIELECTRIC LEDGES ON SEMICONDUCTORS

Victor Emerald Hauser, Jr., Palmerton, Pa., Peter Theodore Panousis, New Providence, N.J., and Vincent De Paul Wohlheiter, Allentown, Pa.; said Hauser and said Panousis assignors to Bell Telephone Laboratories, Incorporated, Murray Hill, N.J., said Wohlheiter assignor to Western Electric Company, Incorporated, New York, N.Y.

Filed Mar. 15, 1972, Ser. No. 234,905
Int. Cl. H01l 7/50
U.S. Cl. 156—3 10 Claims

ABSTRACT OF THE DISCLOSURE

Semiconductor articles having multiple-layer dielectric protective coverings are usually provided with openings through the protective coverings. Metallic contacts are made through the openings to the underlying semiconductor material. During the formation of the openings, a ledge often develops in the outer-most layer of dielectric material. The troublesome ledge is removed by subjecting the outer-most material to an etchant which etches away substantially one-half the original thickness of the outer-most material, but at the same time, etches away the entire ledge since the etching action occurs from the underside of the ledge as well as the topside of the ledge.

BACKGROUND OF THE INVENTION

Field of the invention

This invention relates to a process for eliminating troublesome overhanging ledges of dielectric material which develop during etching of openings into plural dielectric layers on semiconductor devices.

Description of the prior art

A commonly used technique for protecting semiconductor articles from alkali-ion penetration involves the use of a plural dielectric protection system. One example of a commonly used combination of dielectrics is, silicon dioxide covered with silicon nitride.

Since it is necessary to make metallic contact with the semiconductor material underlying the protective dielectric film, various openings or windows are cut in the dielectric films usually by an etching process. After an opening is formed through an outer-most film, with one etchant, a second etchant is introduced through an opening to create an opening through the underlying dielectric film. During the time that the opening is being produced through the underlying film, there is usually some lateral etching activity that results in an overhanging ledge of the outer-most film surrounding the entire opening or window.

It has now been recognized that the overhanging ledge which is produced in the outer-most film can have some undesirable effects on the resulting semiconductor articles. A method for processing semiconductors in which the troublesome ledge is removed during the processing steps is disclosed in a Patent application, Ser. No. 234,904 filed in the names of Robert E. Caffrey, Austin C. Dumbri, Richard N. Tauber on even date herewith. The application is assigned to the Bell Telephone Laboratories, Inc.

The technique for removing the troublesome ledge discussed in the above-identified patent application involves the use of a metal film deposited on the outer-most dielectric layer. The metal acts as a mask when an etchant is applied to the outer-most film after the openings or windows are formed through all of the dielectric layers.

The metallic film is removed after the ledge has been removed.

In certain designs of semiconductor products, it is desirable to eliminate a need for deposition of the metallic film and also to eliminate a need for removing the metallic film after the ledge removal is accomplished.

SUMMARY OF THE INVENTION

It is therefore an object of the invention to provide an improved method of removing overhanging ledges of dielectric material from openings through plural dielectric systems on semiconductor articles.

Another object of the invention is to provide an improved ledge removal system in which there is no need to produce a metallic etch mask.

These objectives are achieved by exposing semiconductor articles with the troublesome ledges to an etchant for the outer-most layer. The exposure is of sufficiently long duration to etch away approximately one-half the original thickness of the outer-most layer. The ledges are removed entirely since etching of the ledges occurs from the underside as well as the topside of the ledges.

BRIEF DESCRIPTION OF THE DRAWINGS

Other objects and features of the present invention will be more readily understood from the following detailed description of specific embodiments thereof, when read in conjunction with the appended drawings in which.

DETAILED DESCRIPTION

The invention will be described in connection with a silicon semiconductor material and also in connection with a plural dielectric system comprising silicon dioxide covered by silicon nitride. It is to be understood, however, that the invention is broader than that disclosed in the examples and has applicability to many types of articles and semiconductor systems, such as germanium or 3, 5 semiconductors and also to many types of protective layers.

Figure 1:
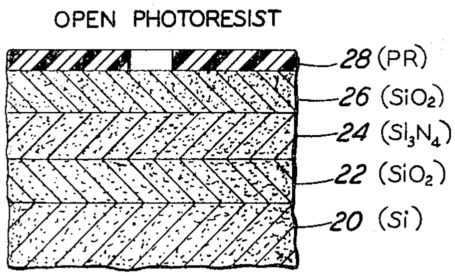
FIGS. 1 through 5 are sectional views through a portion of a semiconductor article having various coatings thereon and illustrating the steps by which an inventive ledge removal technique is practiced.

FIG. 1 shows a portion of a semiconductor article 20 of silicon on which a coating 22 of silicon dioxide has been provided. Over the coating 22, a silicon-nitride coating 24 has been deposited. The silicon-nitride coating 24 is covered by a second coating 26 of silicon dioxide. Finally, over the coating 26 a layer 28 of photo-resist has been applied. All of the coatings of silicon dioxide, silicon-nitride and photo-resist are produced by conventional means. See "Manufacturing Beam-Lead Sealed-Junction Monolithic Integrated Circuits" by S. S. Hause and R. A. Whitner, Western Electric Engineer, December 1967, vol. XI, No. 4, pp. 3–15.

Figure 2:
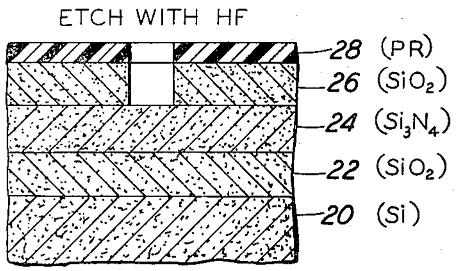

FIG. 2 shows a subsequent step in the process of forming a desired opening through the silicon-nitride coating 24 and silicon-dioxide coating 22. The photo-resist coating 28 is provided with an opening therethrough by conventional photolithographic techniques. A hydrofluoric acid etching operation is performed through the opening in the photo-resist coating 28 to produce an opening in the silicon-dioxide coating 26.

Figure 3:
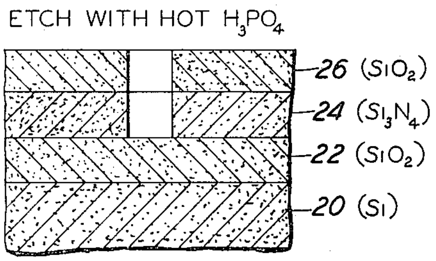

FIG. 3 shows that the photo-resist coating 28 has been removed. The silicon-nitride coating 24 underlying the opened silicon-dioxide coating 28 is etched with a conventional phosphoric acid etch to produce an opening therethrough.

Figure 4:
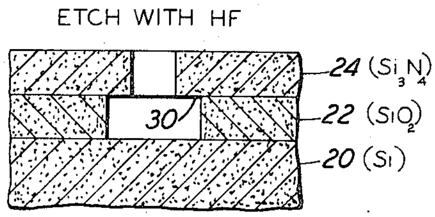

In FIG. 4 the outer-most coating 28 of silicon dioxide has been removed by etching with hydrofluoric acid. Additionally, the hydrofluoric acid has entered the opening through the silicon-nitride coating 24 and has attacked the underlying coating 22 of silicon-dioxide. It can be seen that a certain amount of lateral etching has occurred in the coating 22 of silicon-dioxide. The lateral etching has produced a ledge 30, in the coating 24 of silicon-nitride.

If the ledge 30 were permitted to remain, subsequent processing of the semiconductor article 20 might be jeopardized. For example, a subsequent processing step involves sputtering of platinum into the opening produced through the coatings 22 and 24. The platinum is sintered to produce a platinum-silicide coating within the bottom of the opening. The deposition of platinum, however, is inhibited to a certain extent by the existence of the ledge 30. In other words, the ledge 30 produced a shadow effect which prevents platinum from being deposited across the entire surface of the silicon 20 underlying the opening in the silicon dioxide coating 22.

In a subsequent processing step, gold is introduced into the opening to form a metallic contact with the platinum silicide. In the areas under the ledge 30 that platinum failed to reach, there is no platinum silicide. The gold contacts directly with the silicon and forms an undesirable gold-silicon alloy. The presence of the undesirable gold-silicon alloy in some cases, causes shorting and electrical defects in integrated-circuit types of semiconductor devices.

On other occasions, the ledge 30 prevents continuity in a conductive film such as the gold; again obviously, resulting in electrical defects of integrated circuits.

Still another difficulty arising in connection with the existence of the undesirable ledges 30, is that in certain instances back sputtering of metals from the openings is utilized as a method of pattern definition. During a back sputtering operation, there are occasions when the metal, which is being removed, collects under the ledge 30 and produces a conductive filament which also causes electrical defects within integrated circuits.

Figure 5:
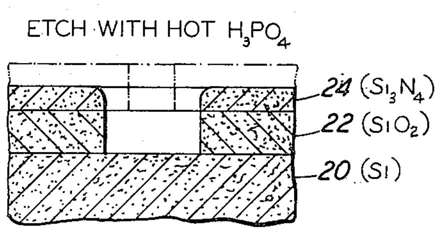

FIG. 5 illustrates the result of practicing a novel ledge removal process. The coating 24 of silicon nitride is subjected to a second exposure of phosphoric acid. During the exposure to prosphoric acid, the upper-side of the silicon nitride 24 is etched away. In addition, the bottom side of the ledge 30 is also etched away. As etching of the ledge 30 proceeds from the top and bottom side, eventually the ledge will be entirely removed. The top side of the entire coating 24 of silicon nitride will also be attacked during the etching process, but the coating 24 will only be reduced in thickness by approximately 50% within the time necessary to remove 100% of the ledge 30.

It is possible to perform the inventive etching process for ledge removal with conventional phosphoric acid at a conventional temperature of 180° C. However, additional advantages are obtained by employing an etching solution consisting of phosphoric acid with an oxidizing agent therein, such as sulphuric acid. Additionally, it is desirable to perform the ledge removal etching at a temperature of 160° C. rather than the more conventional 180° C. The result of using these precautionary practices is that the underlying silicon 20 will not be attacked by the phosphoric acid. The oxidizing agent and the lower temperature of the etchant have the effect of preventing etching of the silicon 20. A description of such an etching solution can be had by referring to a patent application Ser. No. 177,840 filed in the names of P. T. Panousis, H. A. Waggener on Sept. 3, 1971, now Pat. No. 3,715,249 and assigned to Bell Telephone Laboratories, Inc.

In practicing the inventive ledge removal technique, it is, of course, necessary to begin with a coating of the silicon nitride that is at least twice as thick as that which is ultimately needed to provide the desired protection; in this case, protection against penetration of alkali-ions.

Figure 6:
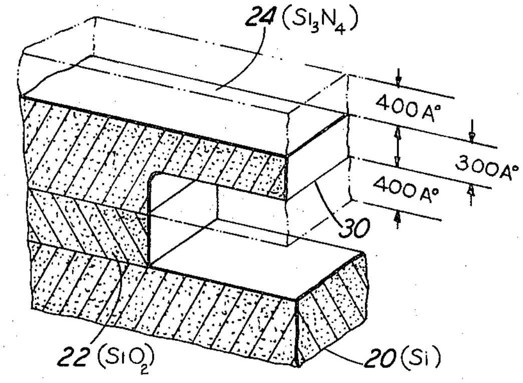
FIG. 6 is an illustration of a portion of a ledge of dielectric material overhanging an opening showing a desirability of a minimum thickness of the dielectric material.

There is an additional desirability for a thick silicon nitride coating, which is not so obvious. It appears that on certain occasions during the ledge removal etching step, the silicon nitride ledge 30 becomes structurally weak to the extent that the ledge bends downwardly into the opening. If this downward bending occurs, the etching activity on the underside of the ledge 30 is reduced and the desired removal of the ledge may not occur before the time that one-half of the original silicon-nitride coating 24 is removed. It has been found that, if at least 400 angstroms of silicon nitride are removed from the underside of the ledge, then the associated problem of the ledge 30 bending downwardly does not occur. It is theorized that the removal of at least 400 angstroms of silicon-nitride eliminates a stressed region beneath the ledge 30, and thus prevents the undesirable bending of the ledge when the ledge is thinned during etching. In order to achieve a removal of at least 400 angstroms from the underside of the ledge 30, it is necessary to begin the etching of the ledge on a silicon-nitride coating 24 that is initially at least 1100 angstroms thick. When the silicon nitride is approximately 1100 angstroms, a self-supporting ledge having a thickness of 300 angstroms exists after 400 angstroms have been removed from the underside and top-side of the ledge. This situation is illustrated in FIG. 6.

Since silicon nitride is used to prevent sodium-ion penetration into a semiconductor, it is necessary to assure that the silicon-nitride coating remaining after the ledge removal process is sufficiently thick to perform its desired function. It is known that a silicon-nitride film, which is reduced by etching to one-half its original thickness, potentially has a higher pin-hole density than a silicon-nitride film that is originally deposited at the thickness equivalent to the final thickness resulting from etching the thicker film. In other words, if a film has an original thickness of a dimension D and is etched to a thickness of $D/2$, the pin-hole density may be higher than that of a film which is deposited to an original thickness of $D/2$.

This statistical anomaly has some bearing on the nature of semiconductor devices on which the inventive ledge removal process may be used. If it is extremely important to have a low pin-hole density, then precautionary consideration should be given to employing this inventive method. For example, if a semiconductor device has a very low surface doping, in the order of $10^{15}$ atoms/cc., there could result premature bias-aging failure from excessive pin-holes. However, semiconductor devices that are very heavily doped on their surfaces, (for example, doping levels greater than $10^{18}$ atoms per/cc., such as disclosed in U.S. Pat. 3,575,741 issued to B. T. Murphy on Apr. 20, 1971), are not adversely affected by the increased pin-hole density resulting from a reduction of the silicon-nitride film to one-half its original thickness.

Although certain embodiments of the invention have been shown in the drawings and described in the specification, it is to be understood that the invention is not limited thereto, is capable of modification and can be arranged without departing from the spirit and scope of the invention.

What is claimed is:

1. A method for producing an article having a coating thereon, wherein the coating has an opening therein and wherein the opening is free of any undesirable ledges of the coating material overhanging the opening which comprises the steps of:

applying the coating to the article with a thickness that is a least twice the ultimate desired thickness;

producing the desired opening in the coating; and subjecting the coating to an etchant for a sufficient time to reduce the thickness of the coating to at least one-half its applied thickness so that any overhanging ledges are entirely eliminated due to etching taking place on the upper side as well as the underside of the ledges.

2. A method for producing an article having a coating thereon, wherein the coating has an opening therein and wherein the opening is free of any undesirable ledges of the coating material overhanging the opening which comprises the steps of:

applying the coating to the article with a thickness that is at least twice the ultimate desired thickness;

producing the desired opening in the coating, resulting in the formation of a ledge overhanging the opening; and subjecting the coating to an etchant for a sufficient time to reduce the thickness of the coating to at least one-half its applied thickness so that the overhanging ledge is entirely eliminated due to etching taking place on the upper side as well as the underside of the ledge.

3. In a method of producing semiconductor articles having a plural layer of dielectric materials on the surface thereof, wherein openings are etched through the layers to the underlying semiconductor material, and wherein a ledge of the outermost layer which overhangs the opening in the layers of dielectric underlying the outermost layer is etched away, the improvement which comprises;

exposing the outermost dielectric to an etchant after the desired openings are formed through all of the dielectric materials, the exposure being of sufficient duration to substantially reduce the thickness of the outermost layer to one-half of its original thickness, whereby the overhanging ledge is removed.

4. A method of producing semiconductor articles having a first layer of an insulative material thereon and a second layer of an insulative material overlying the first layer, wherein openings are formed through the two layers to permit access to the underlying semiconductor material, the improvement which comprises the step of:

exposing the articles to a selective etchant to etch the second layer, such exposure being long enough to etch away at least one-half the thickness of the second layer whereby ledges of the second layer overhanging the opening are etched away completely.

5. The method of claim 4 wherein the semiconductor material is silicon, the first insulative layer is silicon oxide and the second insulative layer is silicon nitrde.

6. The method of claim 5 wherein the etchant is phosphoric acid.

7. The method of claim 5, wherein the silicon nitride is at least 1100 A. thick initially to prevent the ledge from sagging during the etching.

8. The method of claim 5 wherein the etchant is phosphoric acid and sulfuric acid.

9. The method of claim 8 wherein the etchant is maintained at a temperature of about 160° C.

10. A method for producing semiconductor articles having a surface impurity concentration greater than $10^{18}$ atoms per cubic centimeter, wherein the semiconductor material is covered with silicon dioxide, wherein the silicon dioxide is coated with silicon nitride, and wherein the silicon dioxide and silicon nitride coatings have various openings therethrough, which comprises the step of:

subjecting the silicon nitride to an etchant, after the desired openings have been produced through both the silicon nitride and the silicon dioxide coatings, for a period of time long enough to etch away at least one-half of the original thickness of silicon nitride, whereby undesirable ledges of silicon nitride overhanging the openings are etched away.

References Cited

UNITED STATES PATENTS 3,551,196 12/1970 Herczog et al. ...... 156—17 X

WILLIAM A. POWELL, Primary Examiner

U.S. Cl. X.R.

156—8, 11, 16, 17